(12) United States Patent
Lee et al.

(10) Patent No.: US 11,285,657 B2
(45) Date of Patent: Mar. 29, 2022

(54) MANUFACTURING SYSTEM WITH THERMOFORMING FOR A CUSHIONING FOOTWEAR

(71) Applicant: NIKE, Inc., Beaverton, OR (US)

(72) Inventors: Jae Hak Lee, Gimhae-si (KR); Sang Hee Lee, Bukgu (KR); Dae Young Park, Busan (KR); John J. Park, Busan (KR); Jong Chul Seo, Gimhae-si (KR)

(73) Assignee: NIKE, Inc., Beaverton, OR (US)

( * ) Notice: Subject to any disclaimer, the term of this patent is extended or adjusted under 35 U.S.C. 154(b) by 99 days.

(21) Appl. No.: 16/591,289

(22) Filed: Oct. 2, 2019

(65) Prior Publication Data

US 2020/0108545 A1  Apr. 9, 2020

Related U.S. Application Data

(60) Provisional application No. 62/740,779, filed on Oct. 3, 2018.

(51) Int. Cl.
*B29C 51/10* (2006.01)
*B29C 51/18* (2006.01)
(Continued)

(52) U.S. Cl.
CPC ........... *B29C 51/10* (2013.01); *B29C 51/18* (2013.01); *B29C 51/46* (2013.01); *B29K 2075/00* (2013.01); *B29L 2031/504* (2013.01)

(58) Field of Classification Search
None
See application file for complete search history.

(56) References Cited

U.S. PATENT DOCUMENTS 3,713,765 A * 1/1973 Rise ................. B29C 51/18
425/384
4,883,419 A  11/1989 Queirel
(Continued)

FOREIGN PATENT DOCUMENTS

| EP | 0 605 485 A1 | 7/1994 |
| FR | 1352706 | 2/1964 |
| WO | 93/05675 A1 | 4/1993 |

OTHER PUBLICATIONS

International Search Report and Written Opinion for PCT Application No. PCT/US2019/054543, dated Jan. 31, 2020, 10 pages.
(Continued)

*Primary Examiner* — Monica A Huson
(74) *Attorney, Agent, or Firm* — Shook, Hardy & Bacon L.L.P.

(57) ABSTRACT

A thermoforming system for forming a cushioning pod structure that includes a first and a second thermoforming station with each comprised of a film holder and a thermoforming mold holder. The system implements a thermal source that is moveable between the first thermoforming station and the second thermoforming station such that the film holders are between the thermal source and the respective thermoforming mold holder. The system also relies on intentional application of a vacuum source fluidly coupled to thermoforming stations and a movement mechanism configured to move the thermal source between the first thermoforming station and the second thermoforming station. Additional aspects contemplate the implementation of a positive pressure source to aid in the dislodgment of the formed portion, a cooling system to adjust mold temperatures, and/or a fan to efficiently thermoform the component.

19 Claims, 10 Drawing Sheets

(51) Int. Cl.
*B29C 51/46* (2006.01)
*B29K 75/00* (2006.01)
*B29L 31/50* (2006.01)

(56) References Cited

U.S. PATENT DOCUMENTS

| | | |
|---|---|---|
| 5,866,058 A | 2/1999 | Batchelder et al. |
| 2002/0058082 A1* | 5/2002 | Muirhead ............... B29C 66/54 425/384 |
| 2015/0273778 A1 | 10/2015 | Campos, II et al. |

OTHER PUBLICATIONS

International Preliminary Report on Patentability received for PCT Patent Application No. PCT/US2019/054543, dated Apr. 15, 2021, 8 pages.
Office Action received for European Patent Application No. 19794297.2, dated Jan. 7, 2022, 4 pages.

* cited by examiner

MANUFACTURING SYSTEM WITH THERMOFORMING FOR A CUSHIONING FOOTWEAR

CROSS-REFERENCE TO RELATED APPLICATIONS

This application claims to benefit of priority to U.S. Application No. 62/740,779, filed Oct. 3, 2018, and titled "Manufacturing System With Thermoforming For A Cushioning Footwear." The aforementioned has been incorporated by reference herein.

TECHNICAL FIELD

Directed to systems and methods for thermoforming a component used in a cushioning article.

BACKGROUND

Traditional methods and systems for forming a cushioning article, such as a shoe sole portion, include injection molding or otherwise molding the article from a homogenous foamed polymeric composition. The conformance and impact attenuation of the cushioning article depends on the characteristics of the foamed composition, such as resilience. However, in some instances, to conform the cushioning article a pre-loaded stress is applied to the cushioning article, which affects an ability of the cushioning article to attenuate impact forces while preloaded.

BRIEF SUMMARY

Aspects hereof contemplate systems and methods for forming a portion of a cushioning pod. Specifically, a thermoformed portion of the cushioning pod is formed from an efficient system and method. The cushioning pod may be used in an article of footwear (e.g., shoe) as an impact-attenuating portion, such as a sole. The system for forming a cushioning pod structure includes a first and a second thermoforming station with each comprised of a film holder and a thermoforming mold holder. The system implements a thermal source that is moveable between the first thermoforming station and the second thermoforming station such that the film holders are between the thermal source and the respective thermoforming mold holder. The system also relies on intentional application of a vacuum source fluidly coupled to thermoforming stations and a movement mechanism configured to move the thermal source between the first thermoforming station and the second thermoforming station. Additional aspects contemplate the implementation of a positive pressure source to aid in the dislodgment of the formed portion, a cooling system to adjust mold temperatures, and/or a fan to efficiently thermoform the component.

This summary is provided to enlighten and not limit the scope of methods and systems provided hereafter in complete detail.

DESCRIPTION OF THE DRAWINGS

The present invention is described in detail herein with reference to the attached drawing figures, wherein.

DETAILED DESCRIPTION

A cushioning structure is formed through the enclosure of a plurality of independent and discrete elements, such as a plurality of beads, which are contained within a cushioning pod structure. The cushioning pod structure is formed, at least in part, with a thermoformed portion from a film substrate. The thermoformed portion is efficiently formed in a system provided herein. The system for thermoforming at least a portion of the cushioning pod structure efficiently forms the thermoformed portions through a sequence of steps provided by various components discussed hereinafter. For example, aspects contemplate forming a first cushioning pod structure at a first thermoforming station of the system while finishing or preparing a second cushioning pod structure at a second thermoforming station of the system. Having multiple thermoforming stations in a common system allows for shared components that reduces costs, time, conveyance, and/or energy consumption as will be discussed hereinafter.

An exemplary aspect contemplates a system comprised of a first and a second thermoforming station with each thermoforming station comprised of a film holder and a thermoforming mold holder. The system implements a thermal source, such as a ceramic heater, that is moveable between the first thermoforming station and the second thermoforming station such that the film holders are between the thermal source and the respective thermoforming mold holder. The common thermal source allows for a common thermal source to be used by both thermoforming stations to reduce costs of the system and costs of operating the system. The system also relies on intentional application of a vacuum source that is fluidly coupled to thermoforming stations. This common vacuum source allows for a single source to effectively draw a vacuum at selective times at each of the thermoforming stations to draw a film substrate into a mold. The system also includes a common movement mechanism that is effective to move the thermal source between the first thermoforming station and the second thermoforming station. Additional aspects contemplate the implementation of a positive pressure source to aid in the dislodgment of the formed portion. Similarly, a common positive pressure source reduces the system costs and the operating costs. Further, the system includes a common cooling system to adjust mold temperatures at both the first and the second thermoforming stations. The cooling system is effective to manipulate a temperature of a mold used in the thermoforming operation to drive efficient cycle times of the system by reducing cooling times of the thermoformed component at the mold. Additional aspects contemplate one or more fans to efficiently thermoform the component through increased airflow at the thermoforming mold. Additional and alternative elements, functions, and/or components are contemplated herein and will be discussed hereafter.

Figure 1:
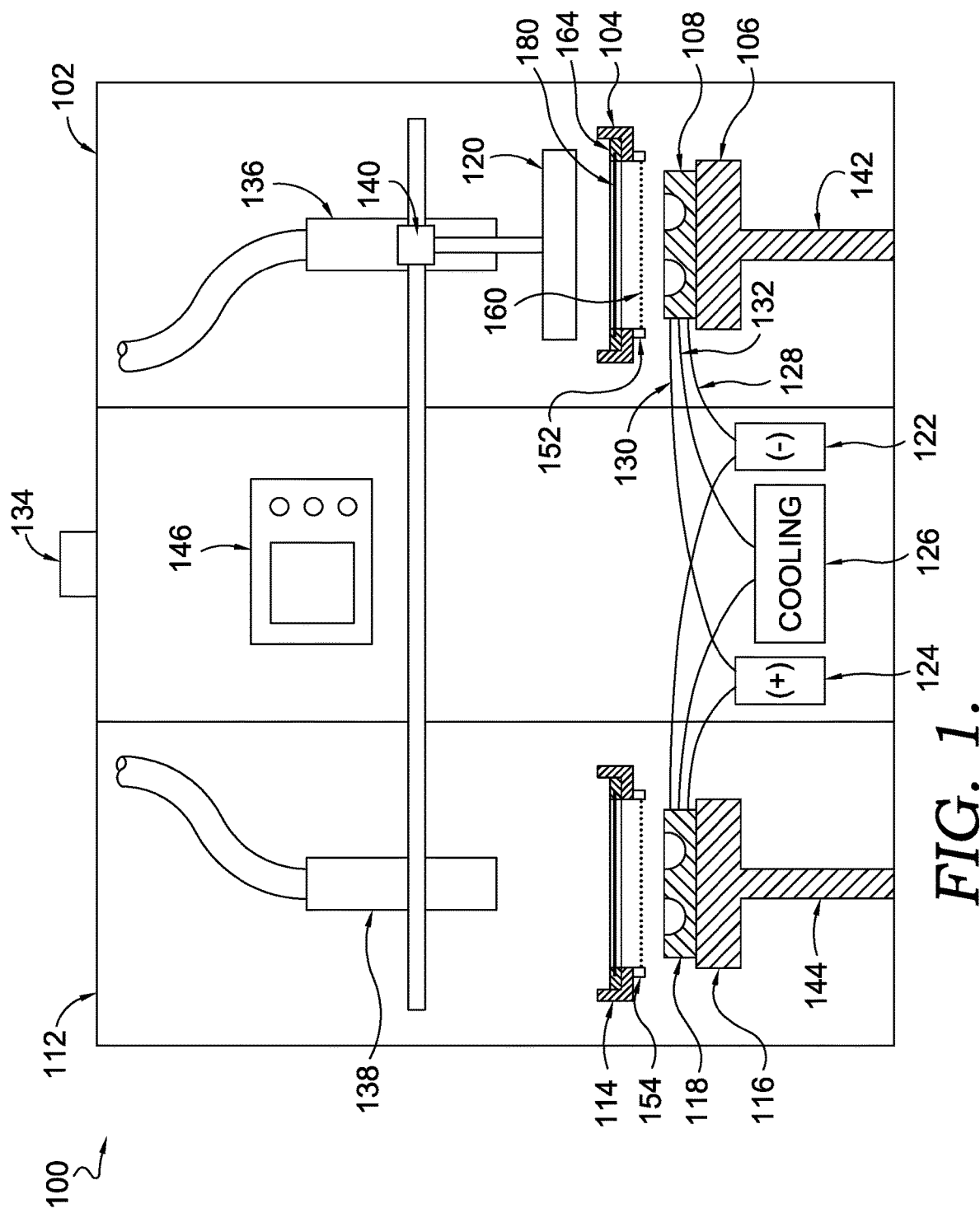
FIG. 1 depicts a system for forming a cushioning pod structure, in accordance with aspects hereof.

Turning to the figures and specifically to FIG. 1, which depicts a system 100 for forming a cushioning pod structure, in accordance with aspects hereof. The system 100 is comprised of a first thermoforming station 102 and a second thermoforming station 112. The first thermoforming station 102 and the second thermoforming station 112 share many similarities as will be discussed hereinafter, but each may be independently operated in some aspects. However, in other aspects the first thermoforming station 102 and the second thermoforming station 112 are complementary stations that are synchronized to efficiently share common resources and components, such as a thermal source 120, a vacuum source 122, a positive fluid source 124, a cooling source 126, a movement mechanism 140, and a controller 146.

The first thermoforming station 102 is comprised of a first film holder 104 that is configured to support a film jig 164. A first sag sensor 152 is positioned below a portion of the first film holder 104. Additionally present is a first thermoforming mold holder 106 supporting a first thermoforming mold 108 and that is moveable between various positions (e.g., a first position 148 and a second position as will be depicted in FIG. 5 hereinafter) by a first actuator 142. Selectively activated and controlled elements also include a first fan 136 and couplings between various shared elements, such as a vacuum coupling 128, a positive fluid coupling 130, and a cooling coupling 132.

The second thermoforming station 112 is comprised of similar elements as the first thermoforming station 102. For example, the second thermoforming station 112 is comprised of a second film holder 114, a second sag sensor 154, a second thermoforming mold 118, a second thermoforming mold holder 116, and a second actuator 144. While a "first" and a "second" of common elements are individually identified in the first thermoforming station 102 and the second thermoforming station 112, commonly named elements are contemplated to have similar structures, materials, results, configurations, and/or positions in aspects. Therefore for brevity herein, a distinction between a "first" of a component and a "second" of a similar component may not be explicitly recited, but it is understood that the disclosure may be applied to any of the commonly recited components/elements/features. For example, any disclosure related to the first actuator 142 is contemplated to equally apply to the second actuator 144 unless explicitly indicated to the contrary herein.

Returning to the first thermoforming station 102, aspects contemplate a film 180 suspended by the film jig 164 formed through a thermoforming process of the system 100 to form a cushioning pod structure. For example, at a high level, the thermal source 120 is positioned to emit thermal energy that operates in a range of 390 degrees Celsius to 410 degrees Celsius (or 395 degrees Celsius to 405 degrees Celsius) that raises a temperature of the film 180 to at least a deformation temperature of the film 180, which allows for a gravity-induced sag of the film (e.g., a stretching and resulting thinning of the film 180 due to the mass of the film 180 and a reduced resistance to deformation caused by an elevated temperature of the film 180). The sagged film is then presented to the first thermoforming mold 108 for forming the film 180 into a thermoformed cushioning pod structure. As will be depicted in the sequence of figures following, a series of components are activated, fluidly coupled, and/or positioned to achieve the thermoforming operation at the first thermoforming station 102.

The movement mechanism 140 moves the thermal source 120 between the first thermoforming station 102 and the second thermoforming station 112. In an exemplary aspect, the movement mechanism is limited to linear travel within the system 100, which may be accomplished through electro-mechanical mechanisms, pneumatic mechanisms, and/or hydraulic mechanisms. Additionally, it is contemplated that the movement mechanisms, in an aspect, is also adapted to move the thermal source in multiple axis of motion (e.g., X and Y axis of motion) through a combination of mechanisms contemplated herein. For example, in an aspect, the movement mechanism 140 is adapted to position the thermal source 120 in the first and second thermoforming stations 102, 112 as well as to vertically position the thermal source 120 at varied heights (e.g., 10-20 cm) relative to another component of the system 100 (e.g., the first film holder 104). The variability in height may be effective to further specialize a process recipe for a given film or component.

The thermal source 120 is a source of thermal energy. In an exemplary aspect the thermal source is a ceramic heating element that is effective to generate thermal energy. Multiple thermal sources are contemplated and within the scope of the present disclosure. For example, the thermal source may leverage radiation, conduction, and/or convection heating mechanisms. Specific examples include, but are not limited to a ceramic heating element, a quartz heating element, a metal heating element, and/or a polymer-based heating element. The thermal energy may be in the form of infrared electromagnetic radiation in any wave lengths, such as near infrared (0.75 to 3 micrometer wavelength), mid-range infrared (3 to 8 micrometer wavelength), and/or far infrared (8 to 15+ micrometer wavelength). It is contemplated that additional thermal energy sources may be leveraged, such as microwave energy. Any combination of thermal energy sources may be implemented to achieve an increase in temperature of the film 180 to at least a deformation temperature. The thermal source may be positioned in a range of 10-20 cm above the film or the film holder to ensure an appropriate heating of the film occurs for a prescribed period of time (e.g., 20-40 seconds). Alternatively, the thermal source may be positioned 5-30 cm above the film or the film holder.

The film 180 may be formed from any material. In an exemplary aspect the film 180 is a polymeric composition. In a more specific example, the film 180 is a thermoplastic polymeric composition. In yet another more specific example, the film 180 is a thermoplastic polyurethane ("TPU"). It is contemplated that the film 180 is any composition capable of being formed into a maintained and intended configuration through a thermoforming operation as provided for herein. The film 180, for example, may be any type of polymeric composition in various aspects, such as a nylon, polyethylene, polypropylene, polyvinyl chloride, and the like. Further, it is contemplated that the film 180 may be comprised of a silicone-based polymeric composition in some aspect.

In aspects of the present disclosure, the film 180 has a deformation temperature that is greater than ambient conditions. For example, the film 180 composition may have a deformation temperature that is above 35 degrees Celsius. A deformation temperature, as discussed above, is a temperature at which the film 180 begins to deform from a first structure (e.g., sheet-like state suspended over an opening in the film jig 164) to a second structure (e.g., a gravity-induced sag through the opening of the film jig 164) as a result of supplemental thermal energy. In some examples, the deformation temperature of the film 180 is above a glass transition temperature of the film 180 at a temperature at which the film 180 softens. Further, in other examples, the deformation temperature is based on a melt temperature of hard segments in a TPU composition, such that the deformation temperature is below (e.g., 15 degrees Celsius to 40 degrees Celsius) a melting temperature of a hard segment phase of the TPU composition. Therefore, various deformation temperatures may exist depending on the composition forming the film 180.

The deformation temperature of the film 180, in an example, is at or above a creep relaxation temperature.

The creep relation temperature Tcr is be determined according to the exemplary techniques described in U.S. Pat. No. 5,866,058. The creep relaxation temperature Tcr is calculated to be the temperature at which the stress relaxation modulus of the tested material is 10% relative to the stress relaxation modulus of the tested material at the solidification temperature of the material, where the stress relaxation modulus is measured according to ASTM E328-02. The solidification temperature is defined as the temperature at which there is little to no change in the stress relaxation modulus or little to no creep about 300 seconds after a stress is applied to a test material, which can be observed by plotting the stress relaxation modulus (in Pa) as a function of temperature (in ° C.).

The deformation temperature of the film 180, in an example, is at or above a Vicat softening temperature.

The Vicat softening temperature Tvs is be determined according to the test method detailed in ASTM D1525-09 Standard Test Method for Vicat Softening Temperature of Plastics, preferably using Load A and Rate A.

The deformation temperature of the film 180, in an example, is at or above a heat deflection temperature.

The heat deflection temperature Thd is be determined according to the test method detailed in ASTM D648-16 Standard Test Method for Deflection Temperature of Plastics Under Flexural Load in the Edgewise Position, using a 0.455 MPa applied stress.

The film 180 is maintained in the film jig 164, as will be illustrated in greater details in FIGS. 8-11 hereinafter. The film jig 164 is effective to secure a portion of the film 180 such that the film 180 extends across an opening through which the film 180 is intended to deform as a sag in response to thermal energy from the thermal source 120. The sag is a downward bulge of the film 180 in a direction of the first thermoforming mold 108. In some aspects, the film 180 is allowed to sag to a predefined distance that is measured by the first sag sensor 152. In other examples, the film 180 is allowed to sag for a predetermined time period from the application of the thermal energy. In yet additional aspects, a combination of time and distance is relied on to determine a sag amount for the film 180. Further, it is contemplated that the sag is determined based on a visual inspection by an operator. Further yet, it is contemplated that the sag is measured by time in relation to the film 180 achieving a specified temperature.

In the example depicted, the first sag sensor 152 is a sensor able to measure an amount of sag created by the film 180. The first sag sensor 152 is depicted as a light-based sensor that detects the sag of the film 180 passing through a plane of the first sag sensor 152 as defined by a light beam 160. Alternative sag sensors are contemplated, but not depicted. For example, a vision-based sag sensor is capable of capturing an image of the film 180 as it sags to determine an amount of sag. A physical contact sensor detects a sag through physical contact of the film 180 and the sensor. A timer, which may be a sag sensor, detects sag through a known sag rate for a specified material under certain conditions. It is contemplate that any combination or type of sensor capable of determining an amount of sag of the film 180 may be used.

The first sag sensor 152 is depicted in the present figures as a non-limiting example emits the light beam 160 in a plane 162 that is substantially parallel to a plane that the first film holder 104 maintains the film jig 164. The light beam 160 may be in a visible or non-visible wavelength. The light beam 160 may be reflected back to the first sag sensor 152 or it may be captured by a counterpart sensor on an opposite side of the first film holder 104. As will be depicted in FIG. 2, a deformation of the film 180 as it sags causes an interruption of the light beam 160 when a sufficient amount of sag is achieved by the film 180. This interruption of the light beam 160 signals that a sufficient or predetermined amount of deformation has occurred in the film 180 for the film 180 to be introduced to the first thermoforming mold 108 for a thermoforming (e.g., vacuum molding) operation.

A thermoforming mold, such as the first thermoforming mold 108, will be depicted and discussed in greater detail in FIGS. 6 and 7 hereinafter. A thermoforming mold provides a surface (e.g., a molding surface) to which the deformed film 180 conforms during a molding operation. The thermoforming mold may include a plurality of apertures. The plurality of apertures may provide a fluid port for drawing a vacuum (e.g., negative pressure relative to ambient conditions) to aid in drawing the film 180 to the molding surface. The apertures may also, in an exemplary aspect, serve as a positive pressure port through which positive pressure fluid (e.g., air) is expelled to aid in a release of the film from the thermoforming mold surface following a molding operation. It is contemplated and will be discussed in greater detail hereinafter that common and/or different apertures may serve the positive and negative pressure operations. The negative pressure may be supplied from the vacuum source 122 via vacuum coupling 128. The positive pressure may be supplied from the positive fluid source 124 via positive fluid coupling 130. A coupling as used herein is a conduit for transfer. A coupling may be a fluid coupling that creates a fluid conduit for transferring a fluid, such as a gas. As will be discussed hereinafter, the cooling source 126 may be coupled via cooling coupling 132 to one or more elements of the system. Similarly, the cooling coupling 132 is a fluid conduit for transferring a fluid, such as a coolant liquid, between one or more components.

While the figures of the present disclosure depict the couplings extending to the thermoforming molds directly, it is contemplated that one or more of the couplings may instead extend to the first thermoforming mold holder 106. For example, in some aspects, one or more of the vacuum coupling 128, the positive fluid coupling 130, and/or the cooling coupling 132 directly or indirectly terminate at the first thermoforming mold holder 106. An operative connection may then be made for one or more of the fluids between the first thermoforming mold holder 106 and the first thermoforming mold 108. In this example, the mold may be exchanged without separately disconnecting the different couplings directly from the mold. Further, mold costs may be reduced by limiting a direct connection between one of the couplings and the mold. For example, instead of passing a cooling fluid directly through the mold to cool the mold, a cooling fluid may pass through the first thermoforming mold holder 106 to conduct thermal energy from the first thermoforming mold 108 to the first thermoforming mold holder 106. In this example, the first thermoforming mold 108 may be designed and created without accounting for cooling passages for the cooling fluid, which can reduce costs associated with the mold. Further, costly connections between a coupling and the mold may be omitted in examples that forego a direct coupling therebetween.

The first thermoforming mold holder 106 holds and positions the first thermoforming mold 108 for different phases of a thermoforming operation. As discussed above, the first thermoforming mold holder 106 may serve as a connection between one or more couplings and the associated mold. Additionally, as provided above, the first thermoforming mold holder 106 may serve as a thermal regulating base (e.g., a heat sink) for an associated mold. The first thermoforming mold holder 106 positions the associated mold in an appropriate position for various stages of the thermoforming operation. For example, the associated first actuator 142 is effective to raise and lower the first thermoforming mold holder 106 having an associated mold secured thereon to specified positions to allow efficient thermoforming of the film 180 to occur.

The first actuator 142 is a movement mechanism capable of changing a position of the first thermoforming mold holder 106. The first actuator 142 may be an electromechanical device, such as a servo motor and one or more mechanical elements to convert the servo motion to linear adjustments. The first actuator 142 may additionally be pneumatic or hydraulic. The first actuator 142 is effective to move the first thermoforming mold holder 106 between at least two positions, if not more at the control of an operator and/or the controller 146.

The first fan 132 is an air movement device effective to aid in the thermoforming operation. For example, the first fan 132 may apply a stream of air to a top surface of the film 180 after (or while) being conformed to the surface of the first thermoforming mold 108. The stream of air is effective to reduce a temperature of the film 180 to a temperature below the transition temperature of the film 180. In another example, the stream of air from the first fan 132 assists in the conforming of the film 180 to the first thermoforming mold 108 through an application of positive pressure on a first side of the film 180 opposite a side of the film 180 in proximity to a molding surface of the first thermoforming mold 108. The first fan may draw air from a location exterior to the system 100 such that potentially elevated temperatures resulting from the operating environment within the system 100 are reduced through the introduction of the air stream by the first fan 132.

A film holder, such as the first film holder 104, provides a maintaining position for a film jig. In an exemplary aspect the film holder is slideable within the system 100 to provide a drawer-like motion for introducing a film jig into the system 100 and for extracting a film jig from the system 100. For example, the film holder may comprise a slide mechanism allowing for the slide movement of the film holder from an internal to an external portion of the system 100 allowing for the introduction and extraction of a film 180 to the respective thermoforming station(s) of the system 100.

The system 100 also includes the exhaust 134. The exhaust 134 is effective to extract air from within the system 100 to aid in reducing an internal temperature of the system 100 and/or to remove particulate, off gases, or other undesired elements from within the system 100 that are generated during the operation of the system 100. The exhaust 134 may be a fan or other blower effective to extract gas from within the system 100. Any number of exhaust elements may be incorporated into the system 100 in various aspects.

The controlled 146 is a computing device effective to control one or more of the components of the system 100. The controller 146 typically includes a variety of computer-readable media and a processor. Computer-readable media can be any available media that can be accessed by controller 146 and includes both volatile and nonvolatile media, removable and non-removable media. By way of example, and not limitation, computer-readable media may comprise computer-storage media and communication media. Computer-storage media includes both volatile and nonvolatile, removable and non-removable media implemented in any method or technology for storage of information such as computer-readable instructions, data structures, program modules or other data.

Computer-storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory includes computer-storage media in the form of volatile and/or nonvolatile memory. The memory of the controller 146 may be removable, nonremovable, or a combination thereof. Exemplary memory includes non-transitory, solid-state memory, hard drives, optical-disc drives, etc. The controller 146 includes one or more processors that read data from various entities such as bus, memory, or I/O components. Presentation component(s) may be included that present data indication to a person or other device. Exemplary presentation components include a display device, speaker, printing component, vibrating component, etc. I/O ports of the controller 146 allow controller 146 to be logically coupled to other devices including I/O components, some of which may be built in. Illustrative I/O components include the input device. A logical coupling that allows for a logically coupled connection is a wired or wireless communication between two devices. Example of a logical coupling include, but are not limited to, near field electronic communication, WiFi, Bluetooth, infrared light, and the like. Examples of wired logical coupling include, but are not limited to, Ethernet, direct bus wiring, and the like.

A logically coupled first device and second device are able to communicate data at least in one direction, if not between the two devices.

The controller 146 is logically coupled by a logical coupling to one or more features of the system 100. For example, the controller 146 may be logically coupled in a wired and/or wireless manner to the thermal source 120, the vacuum source 122, the positive fluid source 124, the cooling source 126, exhaust 134, the first fan 136, the second fan 138, the movement mechanism 140, the first actuator 142, the second actuator 144, the first sag sensor 152, the second sag sensor 154, and/or one or more valves, couplings, and switches of the system 100. The logical coupling is a wired and/or wireless connection that facilitates the transfer of data, as is known in the art.

An input device is optionally provided. The input device may be any input device effective to provide information to the controller 146 or the system 100 in general through a logical coupling that is a wired or wireless connection that facilitates the transfer of data between the input device and one or more components. Examples of exemplary input devices include, but are not limited to, bar code scanners, vision systems, keyboards, cursor manipulators (e.g., computer mouse), radio-frequency identification readers, and the like. For example, it is contemplated that a specific conditions (e.g., process recipe) may be recalled or developed for a specific cushioning pod configuration. The protocol may be retrieved from computer storage through an input from the input device. For example, an identifier, such as a bar code or other identification, may be present on the cushioning pod, the film jig, a work order, or other element. The input device is used to input the identification, which causes a unique protocol to be load and performed by the system 100 on the cushioning pod structure. Use of unique protocols allows for on-the-fly custom forming of various cushioning pod structures with a common system.

The second thermoforming station 112 includes elements similar to those described with respect to the first thermoforming station 102. For example, the second thermoforming station 112 is comprised of the second film holder 114 that is similar to the first film holder 104 described above in connection with the first thermoforming station 102; the second thermoforming mold holder 116 that is similar to the first thermoforming mold holder 106 described above in connection with the first thermoforming station 102; the second actuator 144 that is similar to the first actuator 142 described above in connection with the first thermoforming station 102; the second sag sensor 154 that is similar to the first sag sensor 152 described above in connection with the first thermoforming station 102; the second thermoforming mold 118 that is similar to the first thermoforming mold 108 described above in connection with the first thermoforming station 102; and the second fan that is similar to the first fan 136 described above in connection with the first thermoforming station 102.

While specific components and features are discussed in connection with the system 100, it is understood that one or more may be omitted in some aspects. Further, while specific components and features are discussed in connection with the system 100, it is contemplated that additional components and features may be included while staying within the scope of aspects contemplated. Further, while a specific number, configuration, size, position, and orientation of components comprising the system 100 are depicted and/or described, it is understood this is for illustration purposes only is not limiting unless explicitly indicated to the contrary. Therefore, in some aspects it is contemplated that alternative numbers, configurations, sizes, positions, and/or orientations may be implemented in connection with one or more components of the system 100.

Referring to the FIGS. 1-5 specifically, they depict an exemplary series of operations performed by the system 100 to efficiently and effectively form cushioning pod structures in accordance with aspects hereof. The configuration of FIG. 1 depicts the thermal source 120 positioned at the first thermoforming station 102 by the movement mechanism 140. Each of the first thermoforming mold holder 106 and the second thermoforming mold holder 116 are in a first position as will be illustrated in more detail at FIG. 3. However, it is understood that the first and second thermoforming mold holders 106, 116 may be at different positions from each other as will be depicted hereinafter.

Figure 2:
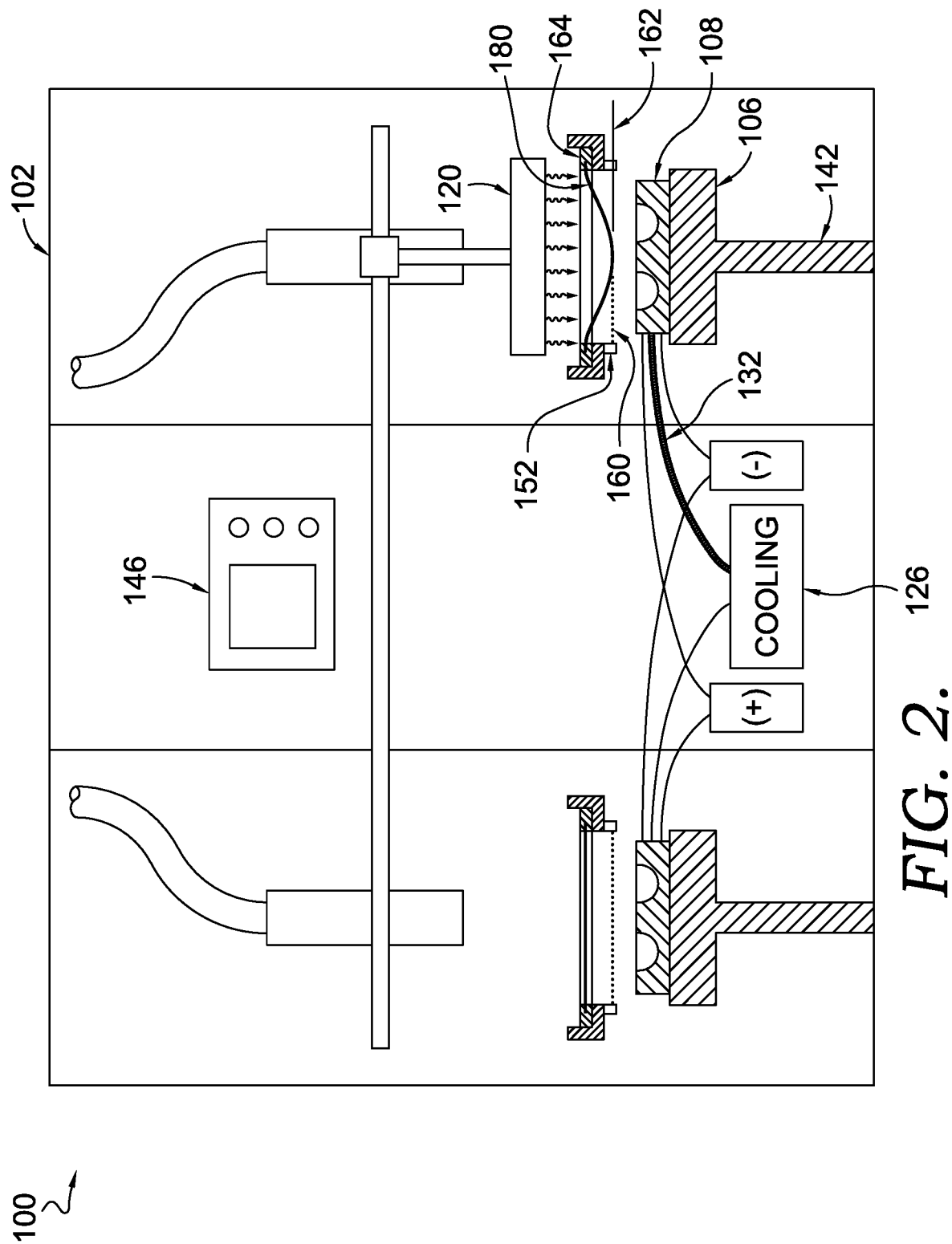
FIG. 2 depicting the system of FIG. 1 at a subsequent phase of a thermoforming operation, in accordance with aspects hereof.

Turning to FIG. 2 depicting the system 100 at a subsequent phase of a thermoforming operation, in accordance with aspects hereof. Specifically, the thermal source 120 is generating thermal energy effective to increase a temperature of the film 180 to at least a deformation temperature. The controller 146 is effective to control an operational state of the thermal source 120. For example, based on a process recipe recalled by the controller 146, the thermal source 120 is instructed by the controller 146 to operate at a specific condition (e.g., a specified temperature, energy usage, energy output). The controller 146 may be omitted in some aspects such that the thermal source 120 instead operates in a binary state of on and off. However, alternative aspects contemplate the thermal source operating in a spectrum of conditions (e.g., a first setting, a second setting, a third setting . . . an "n" setting) as controlled by the controller 146 and/or an operator (e.g., human operator of the system 100).

As a result of the application of thermal energy by the thermal source 120, the film 180 is depicted as sagging through a plane 162 as signified by the light beam 160 being interrupted by the bulging portion of the film 180 sagging through an opening of the first film holder 104. In this example, the first sag sensor 152 detects the sag of the film 180 and sends a signal to the controller 146.

Additionally, the cooling source 126 is providing coolant (e.g., water) via the cooling coupling 132 to the first thermoforming mold 108. However, as discussed above, aspects alternatively contemplate the cooling coupling connected to the first thermoforming mold holder 106. In this alternative example, the first thermoforming mold holder 106 may serve as a heat sink for the first thermoforming mold 108 and/or as an additional fluid coupling through which the coolant may be fluidly communicated to the first thermoforming mold 108. The application of coolant in FIG. 2 is optional in some aspects. The application of coolant, in some aspects, allows for faster cooling of the film 180 once in contact with the first thermoforming mold 108 to a temperature below the deformation temperature to maintain the molded form.

Figure 3:
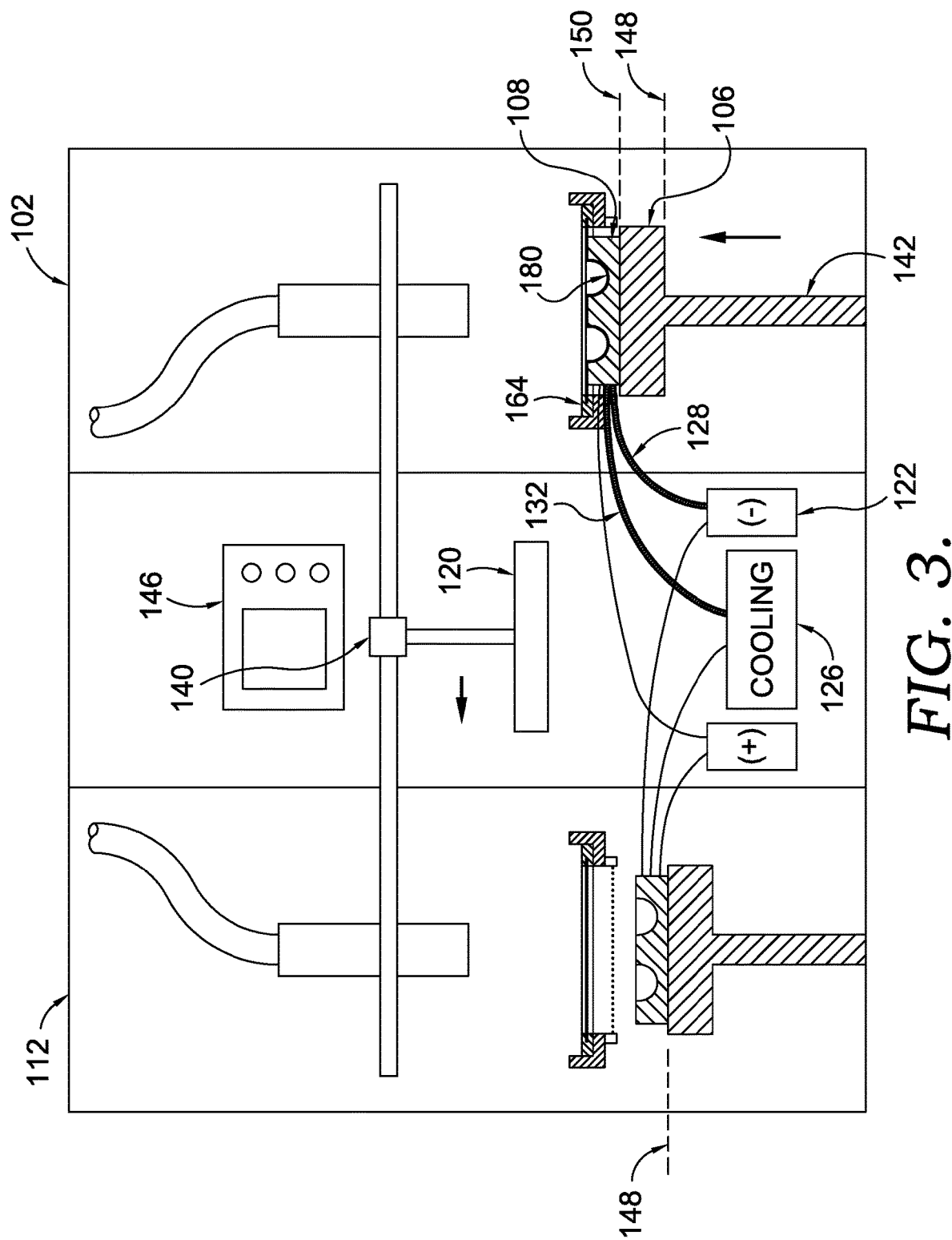
FIG. 3 depicting the system of FIG. 2 at a subsequent phase of a thermoforming operation, in accordance with aspects hereof.

FIG. 3 depicts a subsequent sequence of the thermoforming operation of the system 100, in accordance with aspects hereof. Subsequent to the sufficient sagging of the film 180 in the first thermoforming station 102, the controller 146 causes the movement mechanism 140 to move the thermal source 120 toward the second thermoforming station 112. In this example the thermal source 120 is instructed to reduce or stop emission of thermal energy during the transition in position; however, it is contemplated that the thermal source 120 maintains a continued emission of thermal energy in some aspects.

Also depicted in FIG. 3 at the first thermoforming station is a change in position of the first thermoforming mold holder 106 from the first position 148 to the second position 150 by the first actuator 142 raising the position of the first thermoforming mold 108 to the first film holder 104. The cooling source 126 is depicted as continuing to supply coolant to the first thermoforming mold 108. Additionally, the vacuum source 122 generates a vacuum that is fluidly conveyed to the first thermoforming mold 108 via the vacuum coupling 128. The vacuum supplied by the vacuum source 122 is effective to generate a negative pressure at a molding surface of the first thermoforming mold 108 to aid in the vacuum forming of the film 180 to the first thermoforming mold 108. As a result, the film 180 is depicted as conforming to a molding surface of the first thermoforming mold 108. The first actuator 142, the cooling source 126, the vacuum source 122, and/or one or more other elements (e.g., valves) may be controlled by the controller 146.

Figure 4:
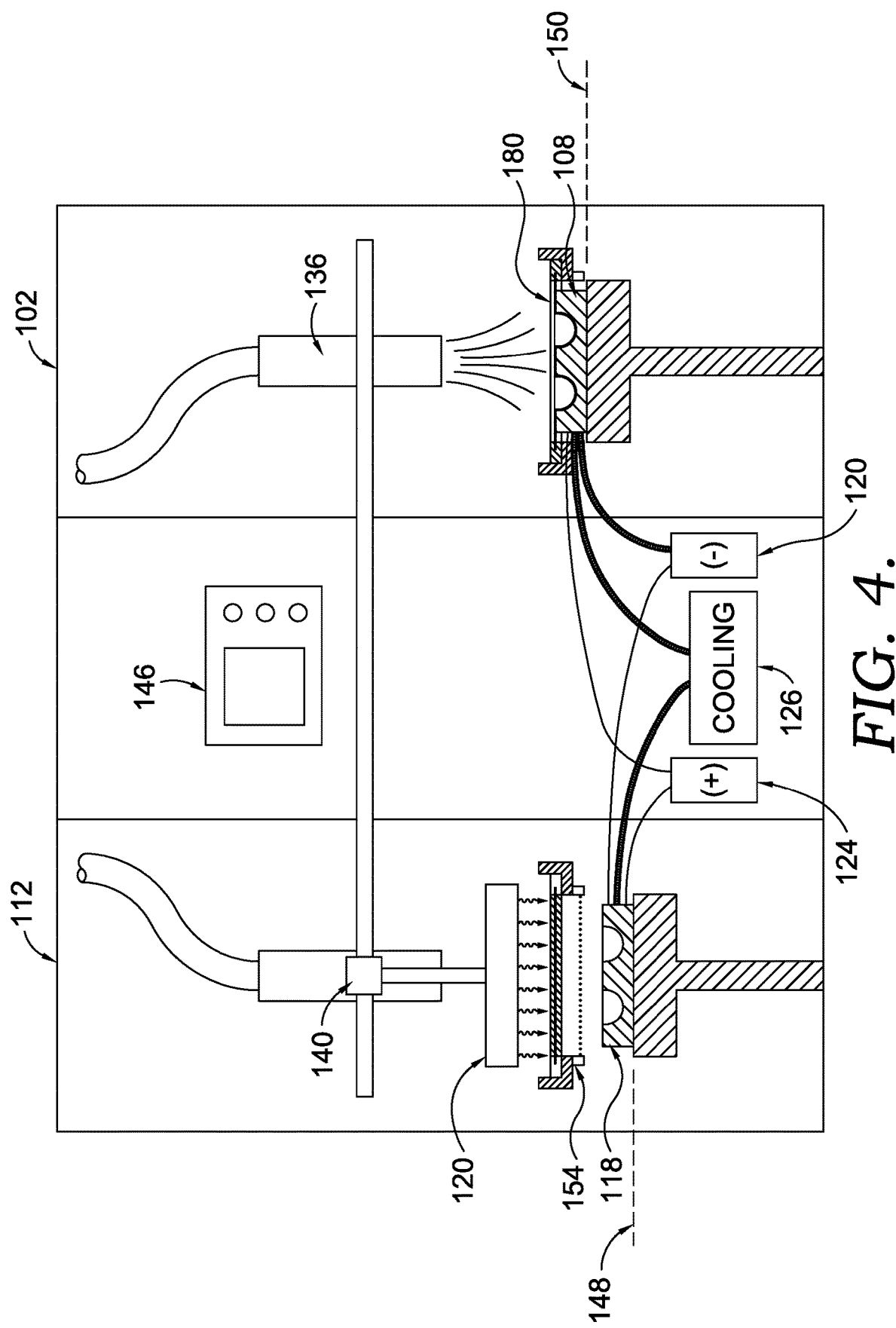
FIG. 4 depicting the system of FIG. 3 at a subsequent phase of a thermoforming operation, in accordance with aspects hereof.

FIG. 4 depicts a subsequent phase of the thermoforming operation performed by the system 100, in accordance with aspects hereof. The movement mechanism 140 conveys the thermal source 120 to the second thermoforming station 112 and positions the thermal source 120 above the second film holder 114 for application of thermal energy to a film contained thereat. As previously described, the motion of the movement mechanism 140 may be controlled by the controller 146. The thermal source 120 is also depicted as emitting thermal energy once at the second thermoforming station 112, which too may be controlled by the controller 146. The cooling source 126 is depicted as providing coolant to both the second thermoforming mold 118 and the first thermoforming mold 108 for reasons previously discussed (e.g., reducing cooling time of a film formed thereon).

Also depicted in FIG. 4 is an application of an air stream from the first fan 136 in the first thermoforming station 102. This air stream aids in the reduction of the film 180 temperature during the vacuum forming stage of the thermoforming operation and the air stream provides a positive pressure to an exterior surface of the film 180 that further aids in forming the film 180, in an exemplary aspect. Simultaneously, the vacuum pressure supplied by the vacuum source 122 is maintained in the first thermoforming station. Therefore, in this example, cooling, vacuum, and an airstream are all concurrently applied to aid in the efficient forming of the film 180 in the first thermoforming station 102. It is understood that one or more of the vacuum, cooling, and/or airstream may be omitted in some examples.

Figure 5:
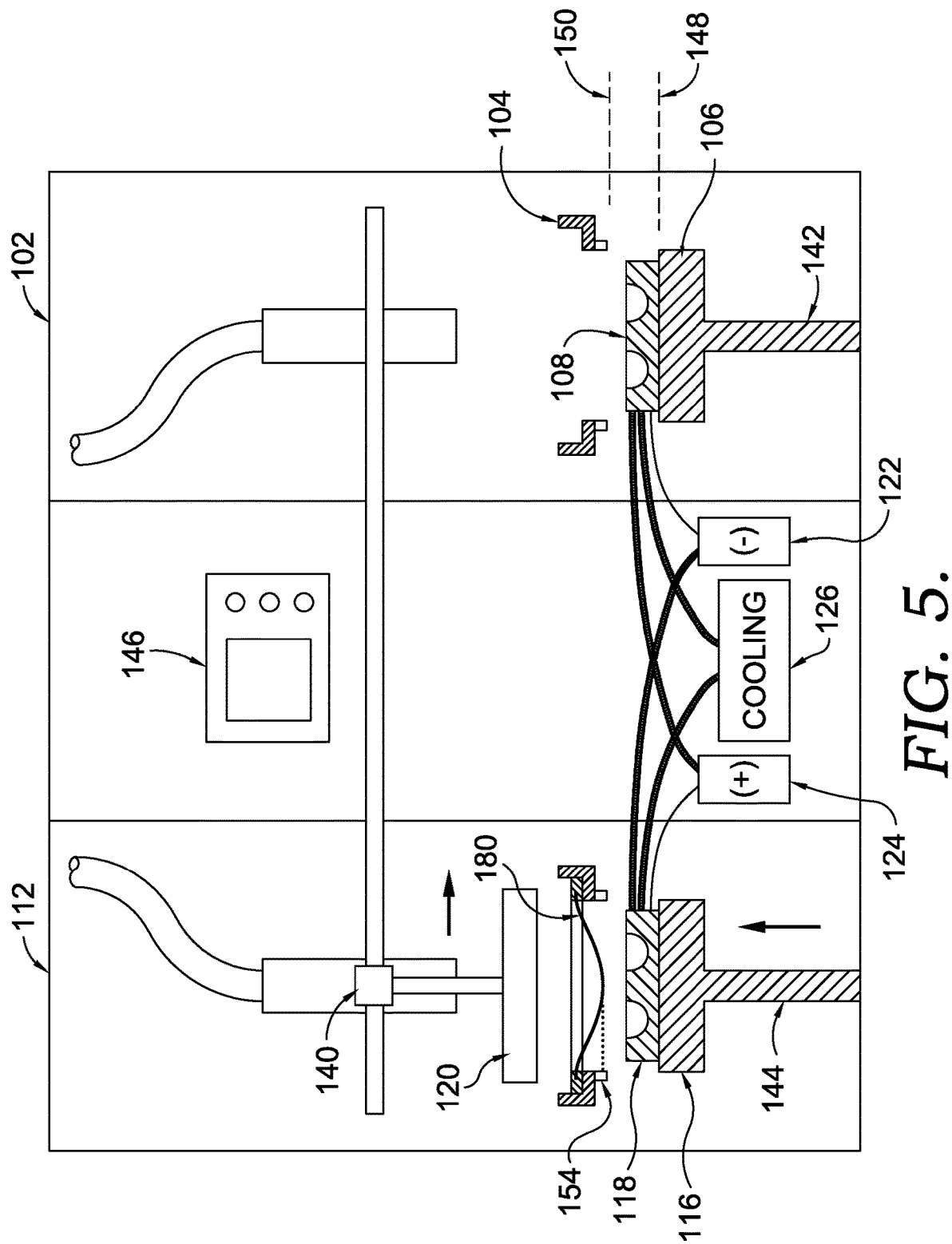
FIG. 5 depicting the system of FIG. 4 at a subsequent phase of a thermoforming operation, in accordance with aspects hereof.

FIG. 5 depicts yet another subsequent phase of the thermoforming operation performed by the system 100, in accordance with aspects hereof. The second thermoforming station 112 is depicted with the film 180 deforming as a result of the thermal energy supplied by the thermal source 120 to sag through a plane defined by the second sag sensor 154. In response to a signal from the second sag sensor 154, the controller 146 controls the thermal source 120 to adjust a thermal output (e.g., reduced energy consumption or stopped energy consumption). Additionally, as also depicted, the movement mechanism 140 begin conveying the thermal source 120 back toward the first thermoforming station 102 in anticipation of repeating the process as depicted in FIG. 1 previously.

In this example, the cooling source 126 and the vacuum source 122 supply respective inputs to the second thermoforming mold 118 (or as previously discussed indirectly provides inputs) via appropriate couplings. This supply of inputs is instructed by the controller 146, in an exemplary aspect. Further yet, the second actuator 144 is depicted as moving the second thermoforming mold holder 116 to a second position for introducing the second thermoforming mold 118 to the film 180 of the second thermoforming station 112.

At the first thermoforming station 102 of FIG. 5 the cooling source 126 provides coolant to the first thermoforming station 102 in an effort to regulate, maintain, or reduce a temperature of the first thermoforming mold 108. In this example the positive fluid source 124 supplies a positive fluid pressure (e.g., compressed air) to the first thermoforming mold 108. The positive fluid pressure is effective to aid in the release of the thermoformed film from the first thermoforming mold 108. For example, a positive pressure is formed between the film and the molding surface to aid in the release and removal of the film from the molding surface.

The first film holder 104 is no longer depicted as holding the film jig 164 at this stage of the thermoforming operation of FIG. 5. In this example, the film jig 164 is removed from the system 100. Another un-deformed film and jig may be inserted into the first thermoforming station 102 at this stage of the process to repeat the cycle from the sequence starting at FIG. 1.

While the illustrated aspects in the present disclosure depicts two thermoforming stations forming the system, it is understood that any number of stations may be leveraged and implemented. For example, a single thermoforming station within the system may be used in practice. In this example, the single thermoforming station may take advantage of novel aspects provided for herein. One example includes a single thermoforming station within the system where the single thermoforming station relies on a film suspended above the mold and therefore leverages the deformation of the film that occurs as the film is heated above a deformation temperature and sags through the influence of gravity on an unsupported portion of the film. Specifically, an example contemplates using the previously discussed film jig having a central opening through which the film deforms under its own weight (or is influenced by a top pressure from the first fan or other mechanical means) while at a temperature above the deformation temperature of the film. The mold may then be raised up to the film and/or the film may be lowered down to the mold for thermoforming. In this example of a single station, it is contemplated that the thermal source may be moved by a movement mechanism to both remove the heating source from the film during the time in which the film is in contact with the mold and to provide better access (e.g., less obstructed access) by a cooling fan or other airflow device during the same time.

Further, it is contemplated the number of thermoforming stations may be increased. For example, to reduce cycle time for a common manufacturing line served by the system, it is contemplated that 3 or more stations may be used for the system.

FIGS. 1-5 depict an exemplary sequence of thermoforming operations in accordance with aspects hereof. It is understood that one or more of the operations, steps, process, and the like may be omitted in exemplary aspects. Further, it is contemplated that additional steps may be added at one or more of the sequence illustrations while staying within the scope contemplated herein.

Figure 6:
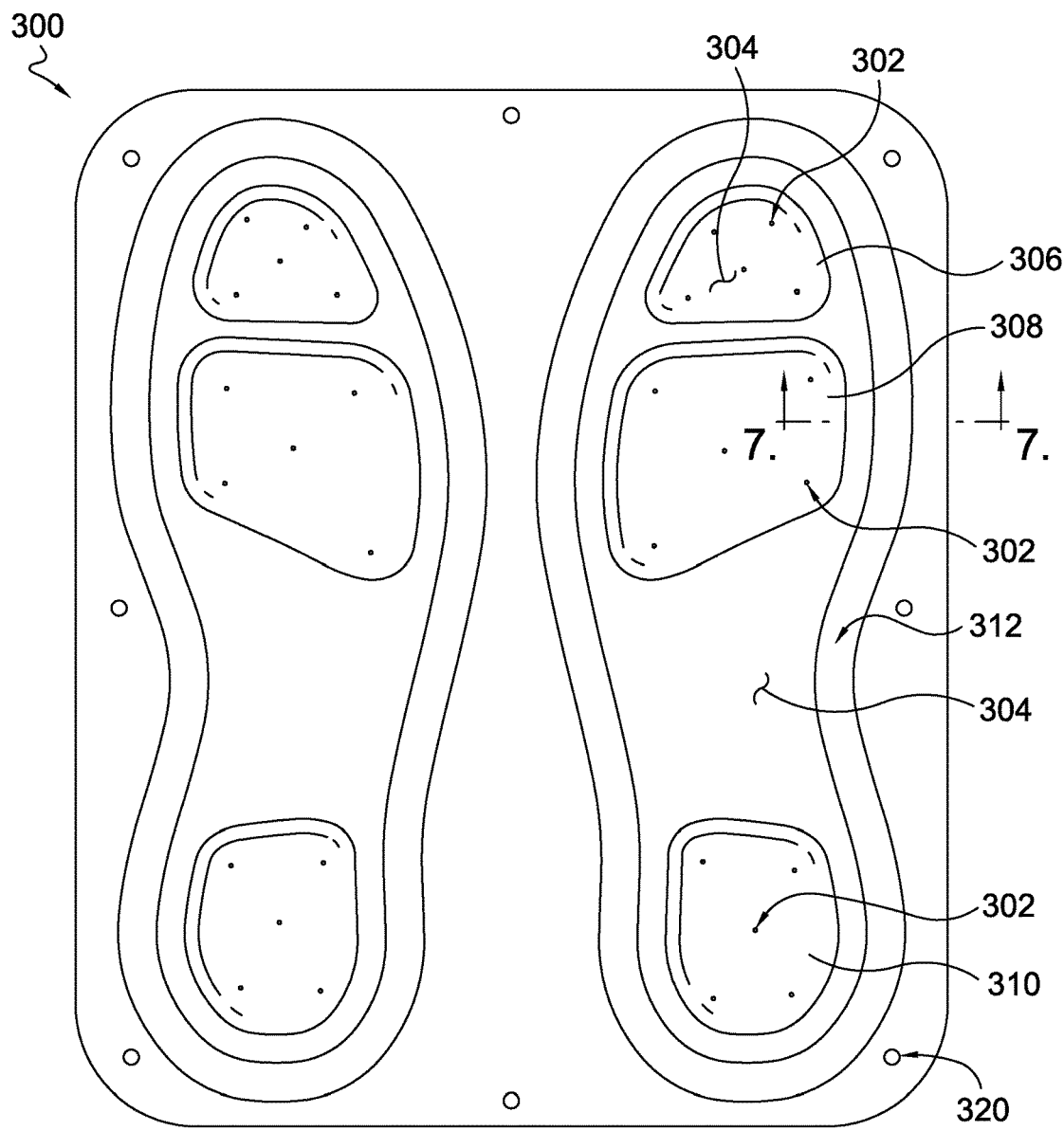
FIG. 6 depicts a mold, in accordance with aspects hereof.

FIG. 6 depicts a mold 300, in accordance with aspects hereof. The mold 300 is an exemplary thermoforming mold, such as the first thermoforming mold 108 and the second thermoforming mold 118 of FIGS. 1-5 discussed previously. The mold 300 may be formed from any material. In an exemplary aspect, the mold 300 is formed from a metallic composition, such as an aluminum-based composition. In alternative aspects the mold 300 may be formed from other compositions, such as steel, polymer, or ceramic. The mold 300 is illustrated as a molding structure for forming a portion of a cushioning pod structure. As previously discussed, a film (e.g., film 180 from FIGS. 1-5) is preheated to a temperature at which it may be molded, a deformation temperature as provided for herein, and then introduced to a mold, such as the mold 300. Once introduced to the mold, the temperature of the film decreases causing a solidification or state change of the film to maintain a shape influenced by the introduced mold. For example, the mold 300 provides a molding surface 304 to which the film is introduced. It is contemplated that a mold release agent (e.g., lubricant) may be dispersed between the molding surface 304 and the film in some examples, but the film is still considered to be contacting or introduced with the molding surface 304 even when such intervening processing materials are implemented. The molding surface 304 includes a variety of features (e.g., recesses, protrusions, surfaces) that are intended to be communicated to the film and, as a result, transferred to the film such that the film is molded to replicate at least some of those features in a molded state. Stated differently, the molding surface 304 defines the molding contours to be achieved (or at least replicated) by the film during a thermoforming operation. Additional features, such as guide marking 320, may be formed in the mold 300 to provide downstream markings, references, and the like.

Further elements of the mold 300 that aid in the effective thermoforming of a film are a plurality of apertures 302. The plurality of apertures 302 are selectively positioned in the molding surface 304 to provide a port through which vacuum or positive fluid pressure may be introduced. The plurality of apertures 302 are fluidly coupled with one or more of a vacuum source and/or a positive fluid source. In one example, a first plurality of the apertures 302 are used exclusively for one fluid communication (e.g., vacuum) while a second plurality of the apertures 302 are used exclusively for a second fluid communication (e.g., positive pressure). In an alternative example, the plurality of apertures 302 are effective for use with both a vacuum and a positive pressure fluid.

In use, a vacuum is drawn through the plurality of apertures 302 during a thermoforming operation to encourage the film to conform to the molding surface 304. A negative pressure is established between the film and the mold 300 by the vacuum draw through the apertures 302 to cause the conformance of the pliable film to be (or being) molded. As such, the thermoforming process may also be referred to as a vacuum molding operation as a result of the reliance on the vacuum pressure from the plurality of apertures 302, in an exemplary aspect.

Because the plurality of aperture 302 are drawing a vacuum during a molding operation where the film is in a state at which point it may accept and then maintain deformation, the sizing of the plurality of apertures is controlled to limit creating visibly perceptive markings from the plurality of apertures 302 on the molded film surface. Each aperture of the plurality of aperture may have a different size of diameter to achieve a different level of attraction (e.g., draw) of the film to the molding surface. In alternative aspects, each aperture of the plurality of apertures 302 has a common diameter to provide a consistent attraction at the locations of the apertures. The diameter of an aperture of the plurality of apertures may be 0.3-0.6 mm (e.g., 0.5 mm) to limit tool markings (e.g., unintentional deformations in the film caused by the tooling (e.g., mold 300) during the thermoforming operation).

The mold 300 includes a plurality of discrete portions, such as a first pod forming surface portion 306, a second pod forming surface portion 308, and a third pod forming surface portion 310. Each of these portions ultimately form discrete pockets in a cushioning pod structure to be filled with particulates, such as beads (e.g., expanded foam beads, such as expanded TPU, expanded thermoplastic elastomer, and/or expanded polypropylene), to form a cushioning system for footwear. The first pod forming surface portion 306 is intended to form a cushioning portion for a toe-end of a shoe. The second pod forming surface portion 308 is intended to form a cushioning portion for a ball region of a shoe. The third pod forming surface portion 310 is intended to form a cushioning portion for a heel region of a shoe.

Each of the pod forming surface regions include a plurality of the apertures 302. In an example, each portion includes perimeter apertures and a central aperture. Depending on a surface area of a portion, a number of aperture in the perimeter and/or the interior may change. In general an aperture is added to a region if a distance from neighboring apertures exceeds a predefined distance, such as 10 mm, 20 mm, 25 mm, 30 mm, 35 mm, 40 mm, or 45 mm. As a distance between the apertures exceeds this distance, an insufficient attraction between the film and the molding surface 304 is maintained to achieve a sufficient molded component. The distribution of perimeter apertures for a discrete portion and an interior aperture(s) aids in a wrinkleless conformance of the film to the molding surface. For example, by placing apertures at a perimeter of a portion having a recessing sidewall, the perimeter apertures aid in pulling the film to the intersection between a first surface (e.g., bottom surface) and an angled surface (e.g., a sidewall surface) to capture the definition of the molding surface at these transition locations (e.g., a corner). Similarly, the internal aperture(s) aid in extracting trapped gas caused by the drawing of the film along mold surfaces. This ensures the film conforms to the interior surfaces of a discrete portion. It is understood that any configuration of apertures may be leveraged to achieve a consistently molded component.

The apertures 302 are also contemplated to provide a positive pressure outflow location in exemplary aspects. For example a positive pressure (e.g., pressurized air) may be intentionally expelled from the plurality of apertures 302 to achieve a dislodgment of the film from the molding surface 304 subsequent to the film cooling or otherwise achieving a molded state. The positive pressure expelled by the plurality of apertures creates a pressure differential relative to an opposite side of the film from the molding-surface-contacting side of the film. The pressure differential aids in dislodging or encouraging a movement of the film away from the molding in a uniform manner to limit damage to the film when removing the film from the mold after being molded.

Figure 7:
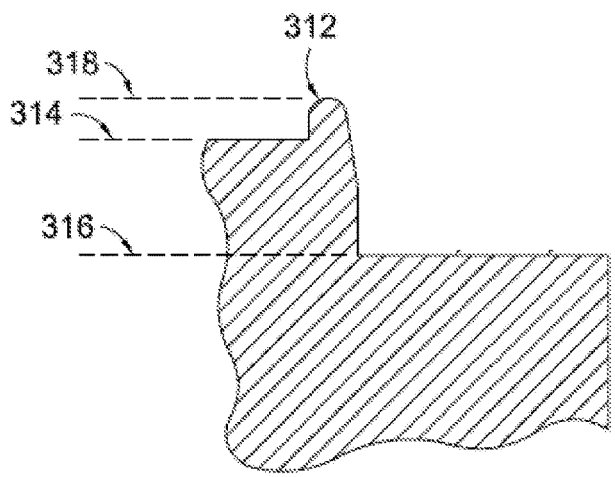
FIG. 7 depicts a cross section portion of the mold from FIG. 6, in accordance with aspects hereof.

FIG. 7 depicts a cross section portion of the mold 300 from FIG. 6 along cutline 7-7, in accordance with aspects hereof. The mold 300, which may be used in connection with the system 100 includes a protrusion 312. The protrusion 312 forms a perimeter of the cushioning pod structure. The protrusion creates an upper-most portion of the mold 300. In practice, as the film is introduced to the mold 300 in a thermoforming operation and a vacuum is drawn through one or more of the plurality of apertures 302, the protrusion forms a seal to the vacuum pressure allowing the film to be attracted and drawn into the molding surface 304 generally and the portions (e.g., the first pod forming surface portion 306, the second pod forming surface portion 308, and the third pod forming surface portion 310) specifically. By having the protrusion 312, the film may be drawn into the discrete portions of the molding surface 304 in a more uniform manner to achieve a smooth and more uniform thickness of the film as it is drawn, deformed, and attracted to the molding surface.

Figure 11:
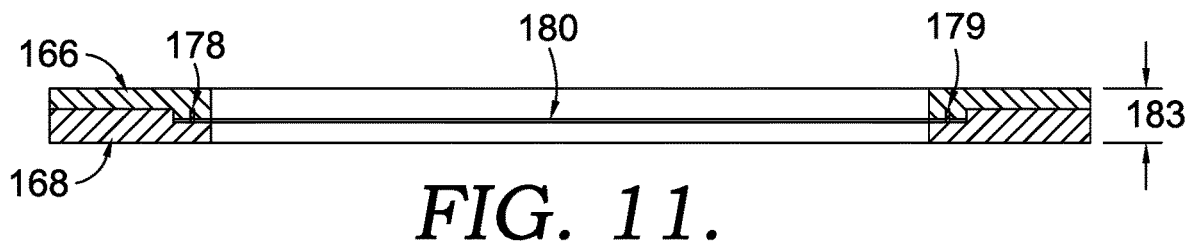
FIG. 11 depicts a cross section view of the film jig comprised of the bottom plate, the top plate, and the film of FIGS. 8-10, in accordance with aspects hereof.

In an exemplary aspect, the protrusion 312 extends 2-5 mm above an interior surface. The distance is depicted as a distance between an interior surface plane 314 and an apex plane 318. The mold surface extends down from the protrusion 312 towards a perimeter portion of the mold a distance depicted as extending between the apex plane 318 and a perimeter plane 316. This distance on an outer portion of the protrusion 312 is sized to receive a film jig, such as the film jig 164 of FIGS. 1-5. The film jig has a thickness, as best seen in FIG. 11, that is intended to recess below the protrusion 312 and nest into the outer portion. As such the distance of the outer portion of the protrusion is sufficient to allow at least a bottom plate of the film jig to be positioned below the apex plane 318 such that the film may contact the protrusion 312 as the film is introduced to the mold 300. This distance may be 3 mm, 4 mm, 5 mm, 6 mm, 7 mm, 8 mm, 9 mm, 10 mm, 11 mm, 12 mm, 13 mm, 14 mm, or 15 mm. For example, as will be discussed in FIG. 11, the film jig has a thickness 183. The thickness 183 may be 5-10 mm. As such, in an exemplary aspect, the outer portion distance to the apex may be any size greater than the thickness 183, such as 7-12 mm.

The mold 300 is exemplary in nature. It is contemplated that any mold having any configuration suitable for thermoforming (or vacuum forming) may be implemented in aspects contemplated. Further, while a specific configuration is depicted for a cushioning pod structure, it is understood that the illustration is not limiting, but instead an example. Alternative sizes, configuration, and structures may be used in any combination to form the mold 300.

Figure 8:
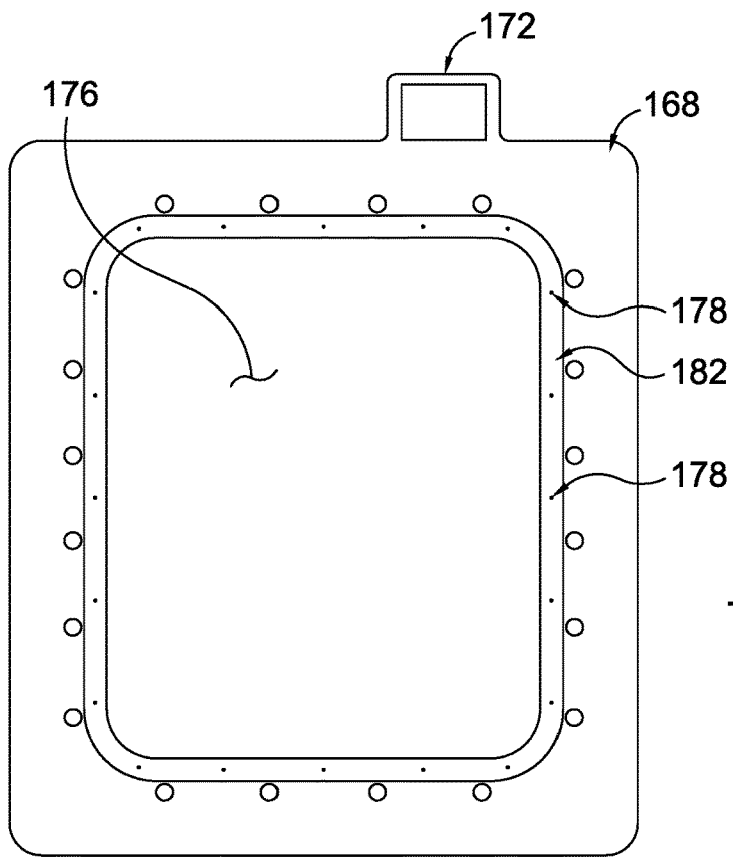
FIG. 8 depicts a bottom plate of a film jig, in accordance with aspects hereof.

FIGS. 8-11 depict various portions and views of a film jig, such as the film jig 164 of FIGS. 1-5, in accordance with aspects hereof. FIG. 8 depicts a bottom plate 168 of the film jig, in accordance with aspects hereof. The bottom plate 168 defines a perimeter forming a central opening 176. The central opening 176 is an opening through which a film is suspended for intentional sagging as part of a thermoforming operation. The central opening 176 is also sized to extend around protrusion portions of a mold, such as the protrusion 312 of the mold 300 of FIGS. 6 and 7. In some aspects, the film jig is maintained a common size regardless of the mold size to which it will be coordinated. In the footwear context, a mold size will depend on a shoe size for which a cushioning pod structure is being formed. Therefore a mold size for a size 6 men's shoe will be smaller than a mold size for a size 16 men's shoe, but in this example the film jig size will be consistent such that the central opening is sized to work with the greater of the mold options (e.g., size 16 mold in this example). The bottom plate may have a size of 400-480 mm in a first direction (e.g., along the edge having a bottom tab 172) and a size of 420-500 mm in a second direction (e.g., perpendicular to the first direction). In yet another example, the film jig has a first size of 420-460 mm by 440-480 mm. By maintaining a consistent size of a film jig, the system 100 may include a static-sized film holder, such as the first film holder 104 of FIG. 1. Alternatively, it is contemplated that the film jig size may be variable and the film holder may be adjustable. The bottom plate is comprised of a film step 182 through which a plurality of mechanical engagements 178 extend. The film step 182 aids in the securement of a film, such as the film 180 of FIGS. 1-5. The film step may have a width of 10-20 mm to sufficiently interact with the film to aid in the securement of the film in connection with the mechanical engagements 178. For example, the film step may be a recess that allows for a film perimeter to be positioned on the bottom plate 168 without creating a physical interference with the between the bottom plate 168 and the top plate 166 of FIG. 9. The mechanical engagements 178 are protrusion elements, such as a pin or mounting pins, that are secured to the bottom plate 168 and are configured to secure the film to the bottom plate. The mechanical engagements 178 are positioned around the central opening 176 to secure the film across the central opening 176. Each of the mechanical engagements may be sized to secure the film without deforming under strain of the thermoforming operation. For example, it is contemplated that each of the mechanical engagements have a diameter of about 1 mm, 2 mm, or 3 mm.

Figure 9:
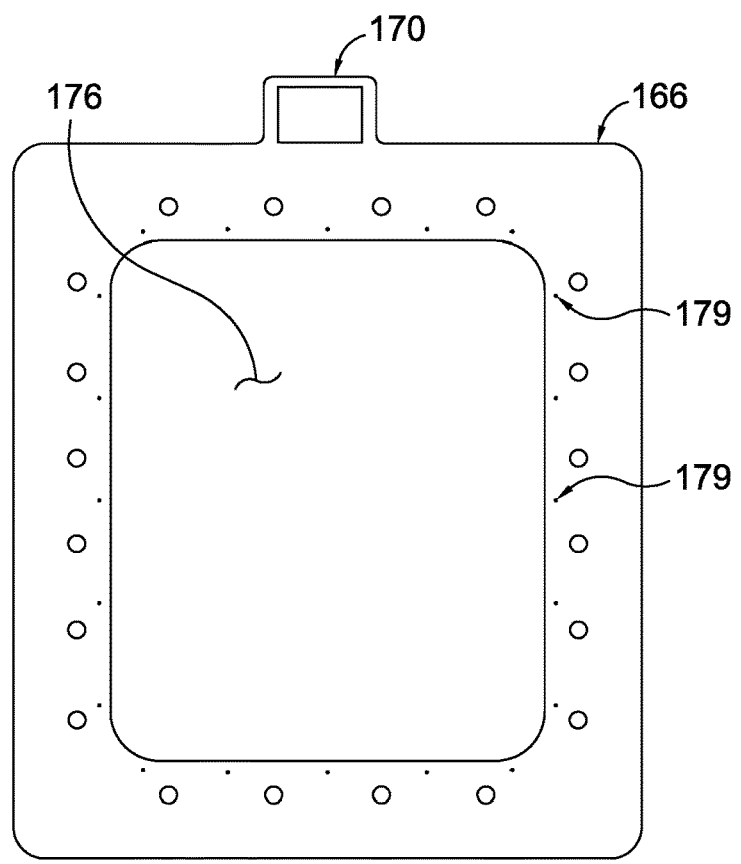
FIG. 9 depicts a top plate of the film jig, in accordance with aspects hereof.

FIG. 9 depicts a top plate 166 of the jig, in accordance with aspects hereof. The top plate 166 also includes the central opening 176 through which a mold portion and/or the film may extend during a thermoforming operation. The top plate 166 also includes a plurality of apertures 179 sized and positioned to receive the mechanical engagements 178 of the bottom plate 168 of FIG. 8. As will be depicted in FIG. 11, the mechanical engagements 178 pass through the film to be received in the apertures 179 of the top plate 166. The apertures 179 therefore aid in supporting the mechanical engagements 178 as they aid in securing the film to the film jig. The top plate also includes a top tab 170. A tab on the film jig may include identification information, such as a bar code that can be read by an input device of the system 100 of FIG. 1. This would allow tracking of the film after being molded to ensure an understanding of the specific configuration of the film contained by the specific film jig, in an exemplary aspect. Alternatively, the tabs of the film jig, as they are depicted as being offset from each other, facilitate an easy separation from one another after a molding operation or in preparation for loading a film therein.

Figure 10:
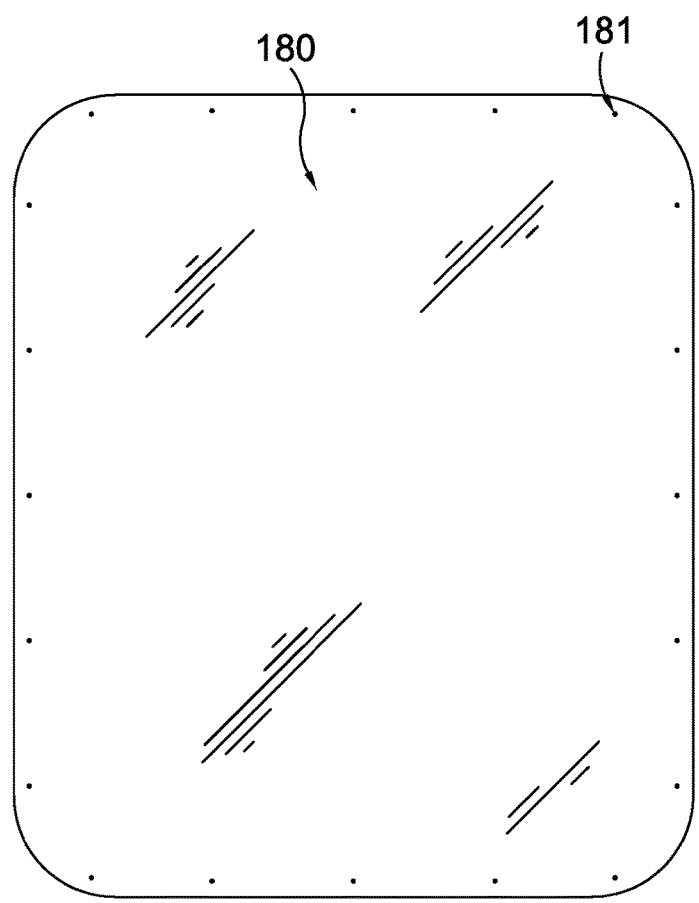
FIG. 10 depict the film prior to being mounted in a film jig, in accordance with aspects hereof.

FIG. 10 depict the film 180 prior to being mounted in a film jig, in accordance with aspects hereof. The film 180 may be pre-cut as depicted in FIG. 10 to include a plurality of apertures 181. The plurality of apertures 181 allow for the mechanical engagements 178 of the bottom plate 168 to pass through the film 180 as they secure the film to the film jig. However, in alternative aspects, the apertures 181 are formed as a result of the mechanical engagements 178 puncturing the film 180 during a securement of the film 180 with the film jig. As previously discussed, the film 180 may be any material able to be thermoformed. In an example, the film 180 is a TPU film having a thickness of 0.8 to 1.2 mm.

FIG. 11 depicts a cross section view of the film jig comprised of the bottom plate 168, the top plate 166 and the film 180 of FIGS. 8-10, in accordance with aspects hereof. As can be seen in this example, the film 180 is secured with the mechanical engagements 178 extending through the film 180 as they extend into the apertures 1719 of the top plate 166. In combination, the film jig containing the film 180 has the thickness 183. The thickness 183 is, in an example, less than a distance between a mold protrusion element and a perimeter surface, as discussed in connection with the cross section of the mold 300 in FIG. 7 previously. By having the thickness 183 less than the distance on the mold protrusion element, a seal may be formed between the film 180 and the mold to facilitate a vacuum drawing of the film 180 into the molding surfaces.

Figure 12:
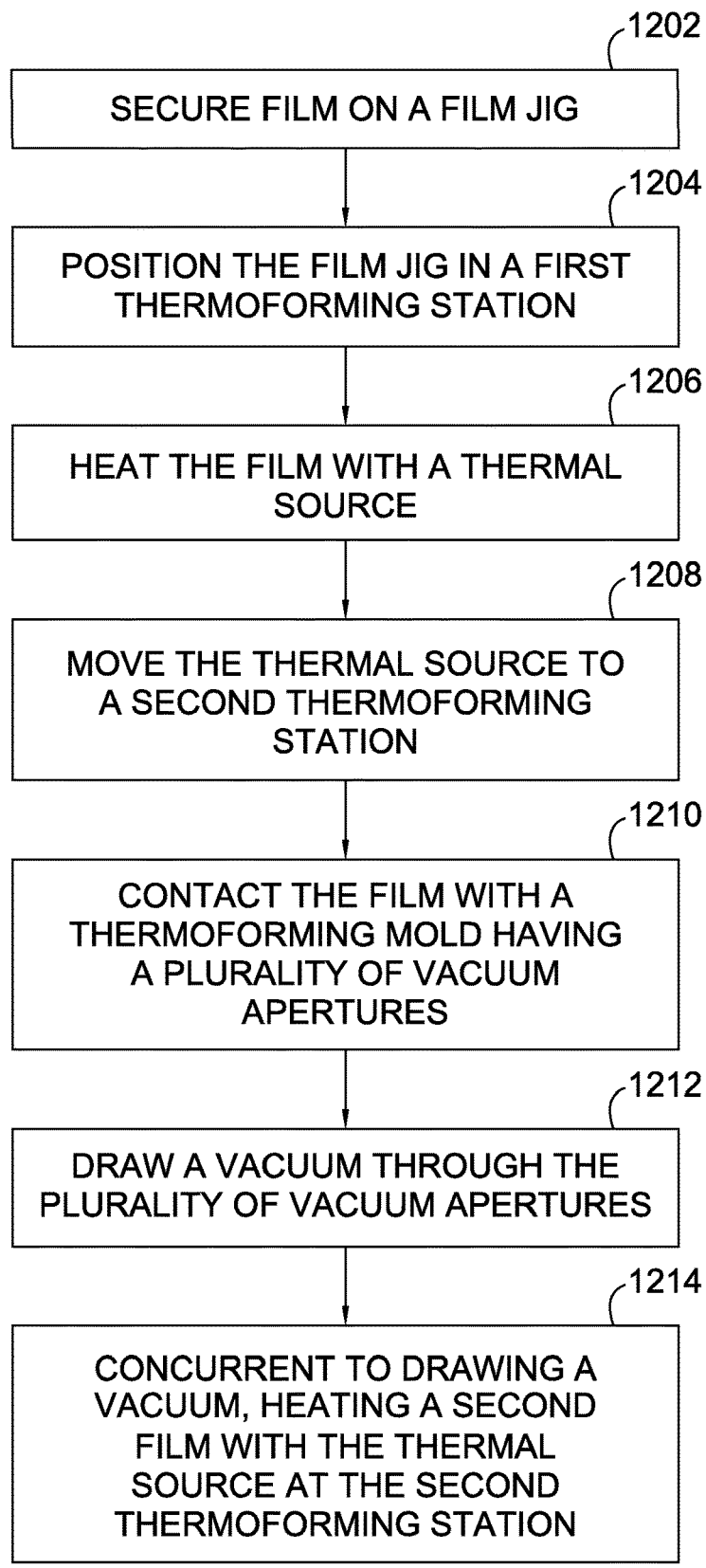
FIG. 12 depicts a flow diagram illustrating a method for forming a cushioning pod structure, in accordance with aspects hereof.

FIG. 12 depicts a flow diagram illustrating a method for forming a cushioning pod structure, in accordance with aspects hereof. At a block 1202 a first polymeric film, such as the film 180 of FIGS. 1-5, is secured to a first film jig, such as the film jig 164 of FIGS. 1-5. The securement may be accomplish in a manner discussed in connection with FIGS. 8-11. For example the film may be secured with a plurality of mechanical engagements extending there through and to the film jig. At a block 1204, the first film jig is positioned in a first thermoforming station at a first film holder. The first thermoforming station may be the first thermoforming station 102 of FIGS. 1-5 and the first film holder may be the first film holder 104 also of FIGS. 1-5. This positioning operation may include a sliding of the first film holder from within the system to a location outside of the system where an operator may place the film jig. The film holder may then be slid back into the system for subsequent operations to be performed on the first polymeric film composition.

At a block 1206 the first polymeric film composition is heated with a thermal source, such as the thermal source 120 of FIGS. 1-5. The thermal source may be a ceramic heater that converts electrical energy into thermal energy that is sufficient to raise a temperature of the first polymeric composition to a deformation temperature of the first polymeric film composition. In alternative or additional aspects, the heat is applied for a defined period of time to achieve a sufficient state of the first polymeric film composition for molding operations.

Subsequent to heating the first polymeric film composition with the thermal source, the thermal source is moved to a second thermal forming station within the common system. For example the movement mechanism 140 of FIGS. 1-5 may be instructed to move the thermal source, as depicted in a block 1208. In a block 1210, the first polymeric film composition is contacted with a first thermoforming mold. This contact may occur concurrently with the previous block 1208. Further, the contacting may occur through the movement of the first thermoforming mold to the first polymeric film, through movement of the first polymeric film to the first thermoforming mold, or any combination thereof.

At a block 1212, a vacuum is drawn through one or more apertures extending through a molding surface of the first thermoforming mold. For example, a vacuum could be drawn through the plurality of apertures 302 of FIG. 6. This vacuum is sufficient to draw in the first polymeric film composition while above a deformation temperature to conform to the molding surface of the first thermoforming mold. The vacuum draw may occur concurrently with the block 1210 step, in an example.

Concurrent to the drawing of the vacuum of the block 1214, a second polymeric film is heated with the thermal source at the second thermoforming station. It is also contemplated that the heating does not occur concurrently with the step of block 1212. In this example of the block 1214, however, efficient use of resource, such as an operator and the heating source, through concurrent operations drive efficiencies in the manufacturing of cushioning pod portions with the system and methods provided herein.

Additional steps are provided in the disclosure that may incorporated into the method depicted in FIG. 12. Further, it is contemplated that one or more of the steps (aka blocks) of FIG. 12 may be omitted. Further yet, one or more steps indicated as occurring concurrently or subsequently may be adjusted to achieve aspects provided herein.

Figure 13:
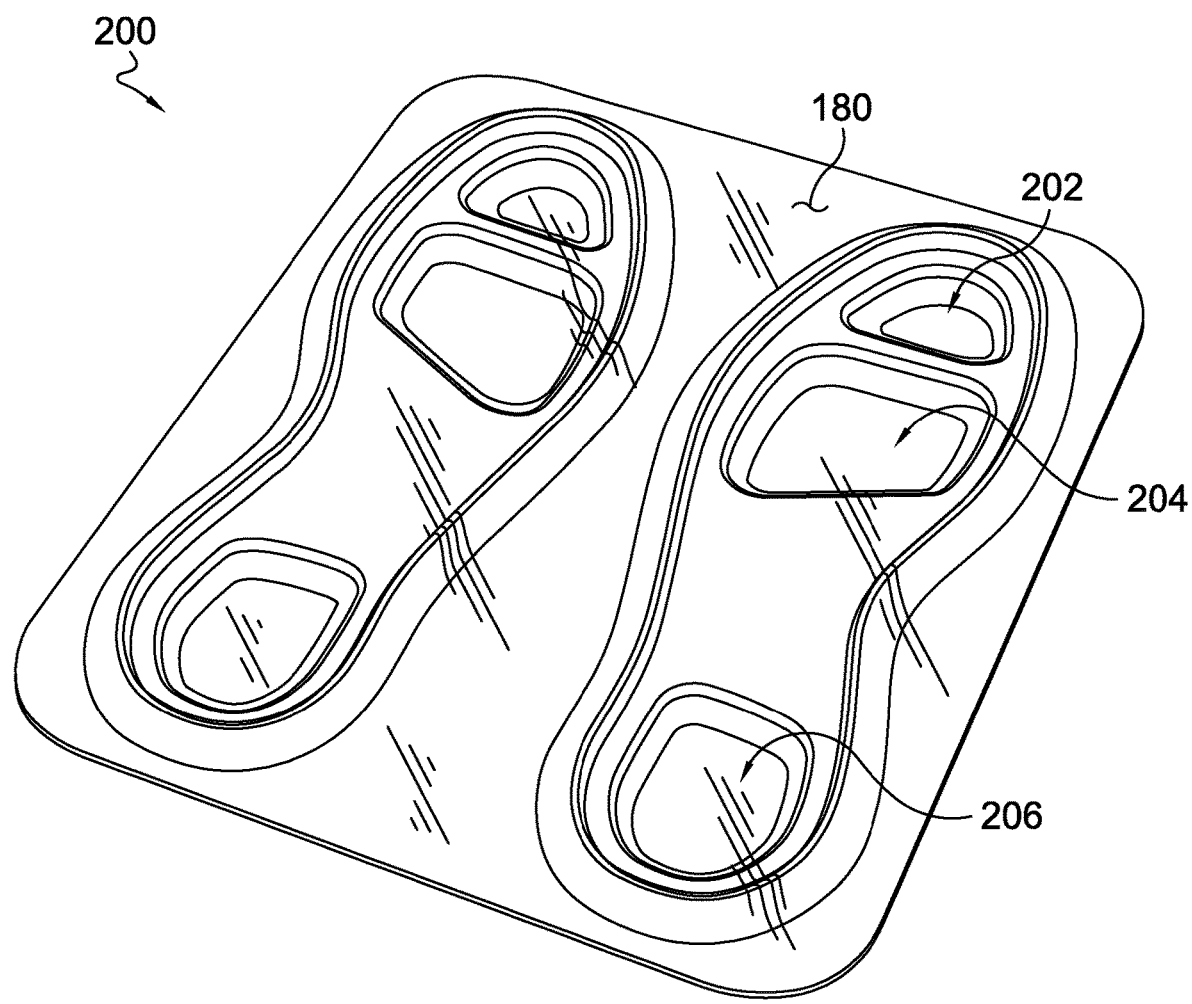
FIG. 13 depicts an exemplary portion of a cushioning pod structure formed in connection with the system and the mold of FIGS. 1-7, in accordance with aspects hereof.

FIG. 13 depicts an exemplary portion of a cushioning pod structure 200 formed in connection with the system 100 and the mold 300 of FIGS. 1-7, in accordance with aspects hereof. The cushioning pod structure 200 is the resulting molded component from the film 180 after being thermoformed by the system 100 and the methods provided herein. The resulting structure may be joined with a top material and then filled with particulate, such as beads, to form the complete cushioning structure. Specific structures include a first pod 202 is formed from the first pod forming surface portion 306 of the mold 300 from FIG. 6; a second pod 204 is formed from the second pod forming surface portion 308 of the mold 300 from FIG. 6; and a third pod 206 is formed from the third pod forming surface portion 310 of the mold 300 from FIG. 6.

As previously described, the use of vacuum through the mold allows for the film 180 to conform to the various surfaces and edges to provide a replication of the molding surface in the finalized molded object. Further, the use of cooling and one or more fans may further speed up the molding process to reduce a cycle time experienced by the system.

A listing of components referenced in the present disclosure is provided below for convenience.

System—100
First thermoforming station—102
First film holder—104
First thermoforming mold holder—106
First thermoforming mold—108
Second thermoforming station—112
Second film holder—114
Second thermoforming mold holder—116
Second thermoforming mold—118
Thermal source—120
Vacuum source—122
Positive fluid source—124
Cooling source—126
Vacuum coupling—128
Positive fluid coupling—130
Cooling coupling—132
Exhaust—134
First fan—136
Second fan—138
Movement mechanism—140
First actuator—142
Second actuator—144
Controller—146
First position—148
Second position—150
First sag sensor—152
Second sag sensor—154
Light beam—160
Horizontal plane—162
Film jig—164
Top plate—166
Bottom plate—168
Top tab—170
Bottom tab—172
Perimeter element—174
Central opening—176
Mechanical engagement—178
Aperture—179
Film—180
Film step—182
Thickness—183
Cushioning pod structure—200
First pod—202

Second pod—204
Third pod—206
Mold—300
Apertures—302
Molding surface—304
First pod forming surface portion—306
Second pod forming surface portion—308
Third pod forming surface portion—310
Protrusion element—312
Interior surface plane—314
Perimeter plane—316
Protrusion apex—318

An exemplary system provided herein include a system for forming a cushioning pod structure having a first thermoforming station comprised of a first film holder and a first thermoforming mold holder; a second thermoforming station comprised of a second film holder and a second thermoforming mold holder; a thermal source moveable between the first thermoforming station and the second thermoforming station, wherein the first film holder is between the thermal source and the first thermoforming mold holder when the thermal source is positioned at the first thermoforming station, and the second film holder is between the thermal source and the second thermoforming mold holder when the thermal source is positioned at the second thermoforming station; a vacuum source fluidly coupled to at least one of the first thermoforming station or the second thermoforming station; and a movement mechanism configured to move the thermal source between the first thermoforming station and the second thermoforming station.

An exemplary method provided herein includes a method for forming a cushioning pod structure. The method includes securing a first polymeric film composition on a first film jig; positioning the first film jig in a first thermoforming station at a first film holder; heating the first polymeric film composition with a thermal source; moving the thermal source to a second thermoforming station; contacting the first polymeric film composition with a first thermoforming mold having a first molding surface and a first plurality of vacuum apertures extending through the first molding surface; drawing a vacuum through the first plurality of vacuum apertures; and concurrent to drawing the vacuum through the first plurality of vacuum apertures, heating a second polymeric film composition with the thermal source at the second thermoforming station.

Unless indicated to the contrary, all measurements (e.g., length, size, area, weight, density) provided herein are determined such that the ambient environment in which the measurements are taking is at the normal temperature and pressure (i.e., 20 degrees Celsius and 1 atm).

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for forming a cushioning pod structure, the system comprising:
   a first thermoforming station comprised of a first film holder and a first thermoforming mold holder;
   a first sag sensor, the first sag sensor is positioned below the first film holder;
   a second thermoforming station comprised of a second film holder and a second thermoforming mold holder;
   a thermal source moveable between the first thermoforming station and the second thermoforming station, wherein the first film holder is between the thermal source and the first thermoforming mold holder when the thermal source is positioned at the first thermoforming station, and the second film holder is between the thermal source and the second thermoforming mold holder when the thermal source is positioned at the second thermoforming station;
   a vacuum source fluidly coupled to at least one of the first thermoforming station or the second thermoforming station; and
   a movement mechanism configured to move the thermal source between the first thermoforming station and the second thermoforming station.

2. The system of claim 1, wherein the first thermoforming station further comprises a first actuator coupled with the first thermoforming mold holder, wherein the first actuator is configured to move the first mold holder between at least a first position and a second position wherein the second position is in closer proximity to the first film holder than the first position.

3. The system of claim 2, wherein the first actuator is in the first position when the thermal source is positioned at the first thermoforming station and the first actuator is in the second position when the thermal source is positioned at the second thermoforming station.

4. The system of claim 1, wherein the vacuum source draws a vacuum from the first thermoforming station when the first actuator is in the second position.

5. The system of claim 1, wherein the thermal source is at least one selected from a ceramic heating element, a quartz heating element, and an infrared heating element.

6. The system of claim 1, wherein the thermal source is positioned within a range of 5 centimeters to 30 centimeters from the first film holder when the thermal source is positioned at the first thermoforming station.

7. The system of claim 1, wherein the thermal source is positioned within a range of 10 centimeters to 20 centimeters from the first film holder when the thermal source is positioned at the first thermoforming station.

8. The system of claim 1, wherein the thermal source operates at a temperature within a range of 390 degrees Celsius to 410 degrees Celsius.

9. The system of claim 1, wherein the thermal source operates at a temperature within a range of 395 degrees Celsius to 405 degrees Celsius.

10. The system of claim 1, wherein the first sag sensor is configured to project a light beam in a horizontal plane, wherein the horizontal plane is a predefined distance from the first film holder.

11. The system of claim 10, wherein the predefined distance is 3 millimeters to 10 millimeters.

12. The system of claim 10, wherein the thermal source is positioned at the second thermoforming station after a film passes through the horizontal plane in the first thermoforming station.

13. The system of claim 1, wherein the vacuum source draws a vacuum from the first thermoforming station when the thermal source is positioned at the second thermoforming station.

14. The system of claim 1, further comprising a first thermoforming mold coupled with the first thermoforming mold holder, wherein the first thermoforming mold is comprised of a plurality of vacuum apertures extending through a molding surface of the thermoforming mold and fluidly coupled with the vacuum source.

15. The system of claim 14, wherein the first thermoforming mold molding surface is comprised of a first pod forming surface portion and a second pod forming surface portion and wherein each of the first pod forming surface portion and the second pod forming surface portion comprise at least a portion of the plurality of vacuum apertures.

16. The system of claim 14 further comprising a positive fluid source, wherein the positive fluid source is selectively and fluidly coupled with at least one of the first thermoforming station or the second thermoforming station.

17. The system of claim 16, wherein the positive fluid source is fluidly coupled with the first thermoforming mold.

18. The system of claim 17, wherein the first thermoforming mold is comprised of a protrusion element, the protrusion element protrudes from the molding surface and a first pod forming surface portion recesses into the molding surface.

19. A method for forming a cushioning pod structure, the method comprising:
   securing a first polymeric film composition on a first film jig;
   positioning the first film jig in a first thermoforming station at a first film holder;
   heating the first polymeric film composition with a thermal source;
   detecting a sag of the first polymeric film composition with a sag sensor;
   moving the thermal source to a second thermoforming station;
   contacting the first polymeric film composition with a first thermoforming mold having a first molding surface and a first plurality of vacuum apertures extending through the first molding surface;
   drawing a vacuum through the first plurality of vacuum apertures; and
   concurrent to drawing the vacuum through the first plurality of vacuum apertures, heating a second polymeric film composition with the thermal source at the second thermoforming station.

* * * * *